(12) United States Patent
Makovsky

(10) Patent No.: US 10,785,119 B2
(45) Date of Patent: Sep. 22, 2020

(54) SYSTEM FOR MONITORING COMPUTERIZED SERVICES

(71) Applicant: ServiceNow, Inc., Santa Clara, CA (US)

(72) Inventor: Bnayahu Makovsky, Savyon (IL)

(73) Assignee: ServiceNow, Inc., Santa Clara, CA (US)

( * ) Notice: Subject to any disclaimer, the term of this patent is extended or adjusted under 35 U.S.C. 154(b) by 193 days.

(21) Appl. No.: 15/491,164

(22) Filed: Apr. 19, 2017

(65) Prior Publication Data

US 2018/0309634 A1 Oct. 25, 2018

(51) Int. Cl.
 *H04L 12/24* (2006.01)
 *H04L 12/26* (2006.01)

(52) U.S. Cl.
 CPC ............ *H04L 41/12* (2013.01); *H04L 41/145* (2013.01); *H04L 43/50* (2013.01); *H04L 43/10* (2013.01); *H04L 43/16* (2013.01); *H04L 43/18* (2013.01)

(58) Field of Classification Search
 CPC ....................................................... H04L 41/12
 USPC ......................................................... 709/224
 See application file for complete search history.

(56) References Cited

U.S. PATENT DOCUMENTS 6,182,136 B1 * 1/2001 Ramanathan ........... H04L 29/06
 709/202
6,286,047 B1 * 9/2001 Ramanathan ..... H04L 29/12066
 370/229
9,215,270 B2 12/2015 Mohaban et al.
2008/0109871 A1 * 5/2008 Jacobs .................... H04L 63/20
 726/1

OTHER PUBLICATIONS

ServiceNow, ServiceNow Documentation, "Get Started With Service Mapping", Date Unknown, Downloaded Mar. 23, 2017, https://docs.servicenow.com/bundle/helsinki-it-operations-management/page/product/service-mapping/concept/service-mapping-get-started.html, 23 pp.
ServiceNow, ServiceNow Documentation, "Entry Point Attributes", Date Unknown, Downloaded Mar. 23, 2017, https://docs.servicenow.com/bundle/helsinki-it-operations-management/page/product/service-mapping/reference/r_EntryPointsforBizSvcDef.html, 6 pp.

(Continued)

*Primary Examiner* — David R Lazaro
*Assistant Examiner* — Zia Khurshid
(74) *Attorney, Agent, or Firm* — Fletcher Yoder PC

(57) ABSTRACT

A computerized service including interconnected components within a computer network is monitored using entry points of a service model corresponding to the computerized service. A discovery process is performed by a discovery mechanism based on an initial entry point of a computerized service. A service model is generated based on results of the discovery process. The service model includes indications of a plurality of components of the computerized service and indications of a plurality of entry points including the initial entry point and at least one additional entry point used for communication between ones of the plurality of components. Using a monitoring mechanism, at least one entry point of the plurality of entry points is tested using at least one protocol associated with the at least one entry point. An event generated based on the test is then processed, such as to identify alerts associated with the computerized service.

13 Claims, 7 Drawing Sheets

(56) References Cited

OTHER PUBLICATIONS

ServiceNow, ServiceNow Documentation, "Business Service Definition", Date Unknown, Downloaded Mar. 23, 2017, https://docs.servicenow.com/bundle/helsinki-it-operations-management/page/product/service-mapping/concept/c_DefineMapBusinessServices.html, 38 pp.

* cited by examiner

SYSTEM FOR MONITORING COMPUTERIZED SERVICES

BACKGROUND

An electronic computing and communications system can process information using software executing on servers at a datacenter. The software can include functionality for managing the status or configuration of hardware or software components of a computer network. For example, the software can notify an administrator or like user of the computer network upon the occurrence of events associated with those hardware or software components.

SUMMARY

Disclosed herein are implementations of systems and techniques for monitoring computerized services.

In an implementation, a system is provided for monitoring computerized services including interconnected components within a computer network. The system comprises a memory and a processor. The memory includes instructions executable by the processor to, using a discovery mechanism, perform a discovery process based on an initial entry point of a computerized service. The memory further includes instructions executable by the processor to generate a service model based on results of the discovery process. The service model includes indications of a plurality of components of the computerized service and indications of a plurality of entry points including the initial entry point and at least one additional entry point used for communication between ones of the plurality of components. The memory further includes instructions executable by the processor to, using a monitoring mechanism, test at least one entry point of the plurality of entry points using at least one protocol associated with the at least one entry point. The memory further includes instructions executable by the processor to process an event generated based on the test.

In an implementation, a method is provided for monitoring computerized services including interconnected components within a computer network. The method comprises, using a discovery mechanism, performing a discovery process based on an initial entry point of a computerized service. The method further comprises generating a service model based on results of the discovery process. The service model includes indications of a plurality of components of the computerized service and indications of a plurality of entry points including the initial entry point and at least one additional entry point used for communication between ones of the plurality of components. The method further comprises, using a monitoring mechanism, testing at least one entry point of the plurality of entry points using at least one protocol associated with the at least one entry point. The method further comprises processing an event generated based on the test.

In an implementation, a non-transitory computer-readable storage medium is provided comprising processor-executable routines that, when executed by a processor, facilitate a performance of operations. The operations comprise receiving, from a management system, a command to test an entry point included in a service model associated with a computerized service. The operations further comprise transmitting a test message to the entry point using a protocol associated with the entry point. The operations further comprise generating an event based on a response to the test message. The operations further comprise transmitting the event to the management system.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
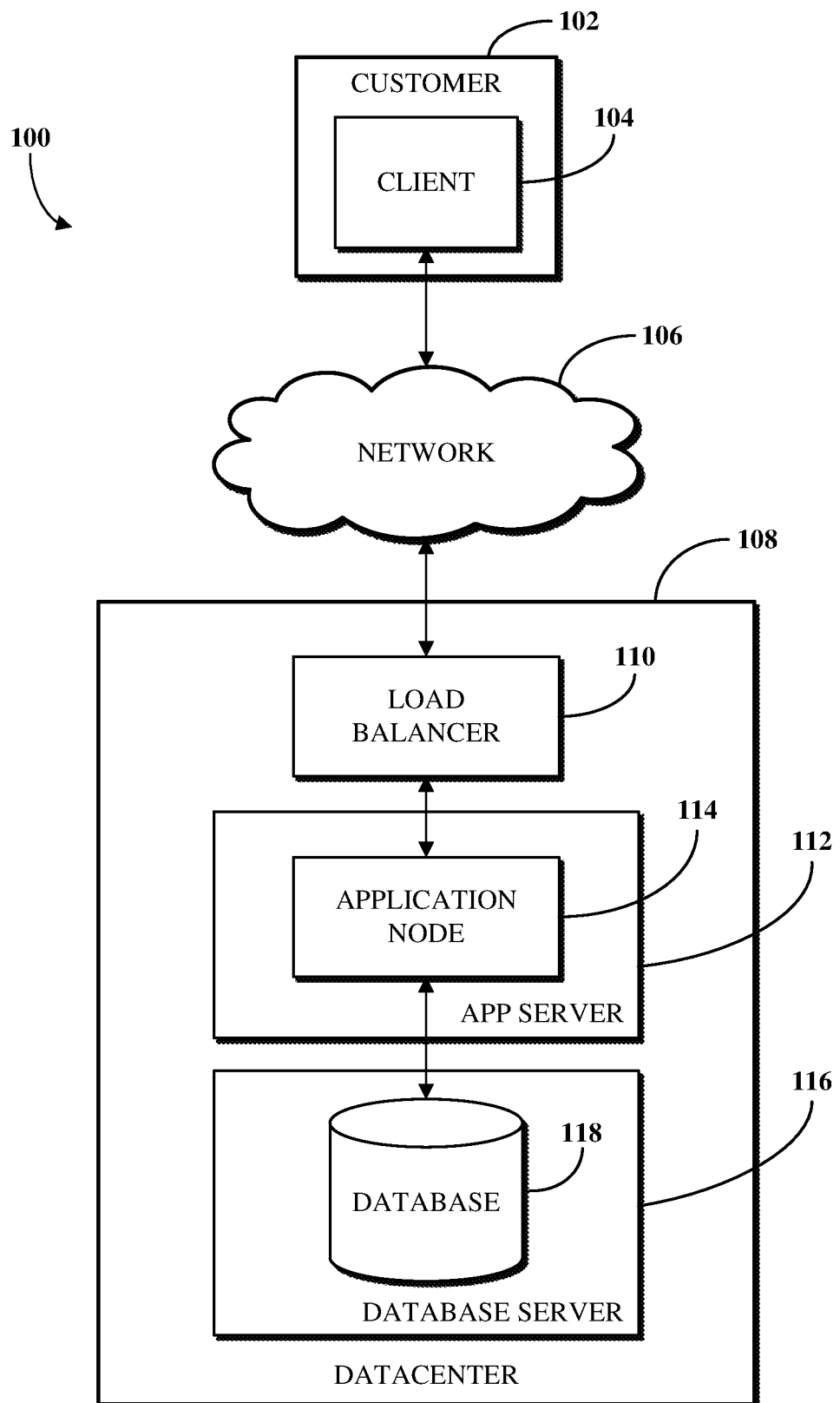
FIG. 1 is a block diagram of an example of an electronic computing and communications system.

Many organizations utilize information technology operations management (ITOM) or like tools to manage computerized systems. ITOM tools may include policies, processes, and procedures to design and maintain the computers in a computerized network and associated devices and software for an organization. For example, ITOM tools may keep track of user computers and associated services, software, servers, routers, etc., within an organization so that administrators can determine when users have been added or removed, when equipment has been added, removed, or needs to be upgraded, when software needs to be updated, or the like.

When dealing with individuals or small organizations, such tasks can be relatively straight forward and easy to perform. However, as organizations and their associated information technology infrastructure grow, designing and maintaining such systems can be a difficult task. It thus may be desirable to store information about the devices, software, and other components of a computer network as configuration items (CIs) in a configuration management database (CMDB). It thus may also be desirable to store information about the services provided by the computer network, such as in a service model. For example, a service model can include the components and relationships between components used to provide a computerized service. A service model can provide a representation of a computerized service and can be used for managing a computing system associated with the computerized service.

A service model can include one or more entry points associated with software and/or hardware components of the corresponding computerized service. As used herein, an entry point can refer to one or more attributes of a component (or a record of a component, for example, a CI of a CMDB) that indicate a connection to that component. For example, an entry point can indicate the name of a host of the component (as applicable, such as where the component is a software component), a port used by the component, a uniform resource identifier (URI) at which the component can be accessed, or the like, or a combination thereof. For example, a service model can be implemented as described in U.S. patent application Ser. No. 15/334,701, which is incorporated herein in its entirety.

In some cases, a software component of a computerized service may be implemented by a third party. For example, the computerized service may include software provided or otherwise hosted by Amazon Web Services®, Microsoft Azure®, or another cloud-based software environment. For example, Amazon Web Services® can implement an Oracle® relational database management system used in a computerized service for providing a web application.

However, these third party-implemented components may not be fully accessible within the computer network that includes the computerized service. For example, a customer of a computing (e.g., Platform-as-a-Service (PaaS)) provider may rely upon monitoring tools to identify events occurring within a computer network with respect to those components. An event is a notification of the state or change in state of hardware or software associated with a computer network. For example, an event can indicate information associated with software, such as the status of a process executing on a device, a number of semaphores, and the like. An event can indicate a logged message, warning, or error associated with the computer network. For example, an event can indicate that a software component is unavailable.

Without the use of the monitoring tools or direct access to the third party environment from which a component is implemented, the customer of the computing provider may not have visibility to events occurring with respect to those components. For example, the customer of the computing provider may rely on the third party or the monitoring tools to notify the customer when one such third party-implemented component suffers a power, hardware, network, or other failure rendering it inaccessible to the computerized service of the customer. This may result in events or components for all or a portion of the computerized service being unavailable. Further, the customer may not be able to identify the cause of that unavailability (e.g., the component directly affected by a failure), and so the customer may have to wait to receive details about the failure from a third party before the customer can restore the computerized service.

Implementations of this disclosure address problems such as those described above by implementing functionality within a customer environment for testing entry points included in a service model generated based on a computerized service of the customer environment. By linking the generation of events to entry points discovered during a top-down discovery process of a computerized service, the status of components associated with the computerized service may be more reliably and efficiently monitored. A discovery process performed by a discovery mechanism can be based on an initial entry point of the computerized service. A service model can be generated based on results of the discovery process. The service model can include indications of components of the computerized service and indications of entry points including the initial entry point and at least one additional entry point used for communication between ones of the components. Using a monitoring mechanism, the entry points can be tested, such as using protocols associated with respective ones of the entry points. An event can be generated based on the test. The event can then be processed, such as to identify alerts associated with the computerized service. The discovery mechanism and the monitoring mechanism can be implemented using an agent device of the customer environment, which agent device can use an open channel to a management system within the provider environment to communicate data, such as results of the discovery process and events generated based on tests, to the provider environment.

Implementations of this disclosure provide technological improvements particular to computer networks, for example, those concerning the monitoring of connections to components of a computerized service. Computer network-specific technological problems such as those can be wholly or partially solved by implementations of this disclosure. For example, implementations of this disclosure include using software and hardware components within a customer environment to monitor components of a computerized service by testing entry points included in a service model generated based on the computerized service. For example, a mechanism within the customer environment can transmit test messages to an entry point to determine the status of a connection to a component associated with that entry point, a response time for accessing that component, or the like. A management system within a provider environment can receive information about the test and use that information to determine whether the status or configuration of the service model has changed. Implementations of this disclosure can thus introduce new and efficient improvements in the ways in which connections to components of a computerized service are monitored, such as without having to rely upon notifications from third party sources.

Figure 2:
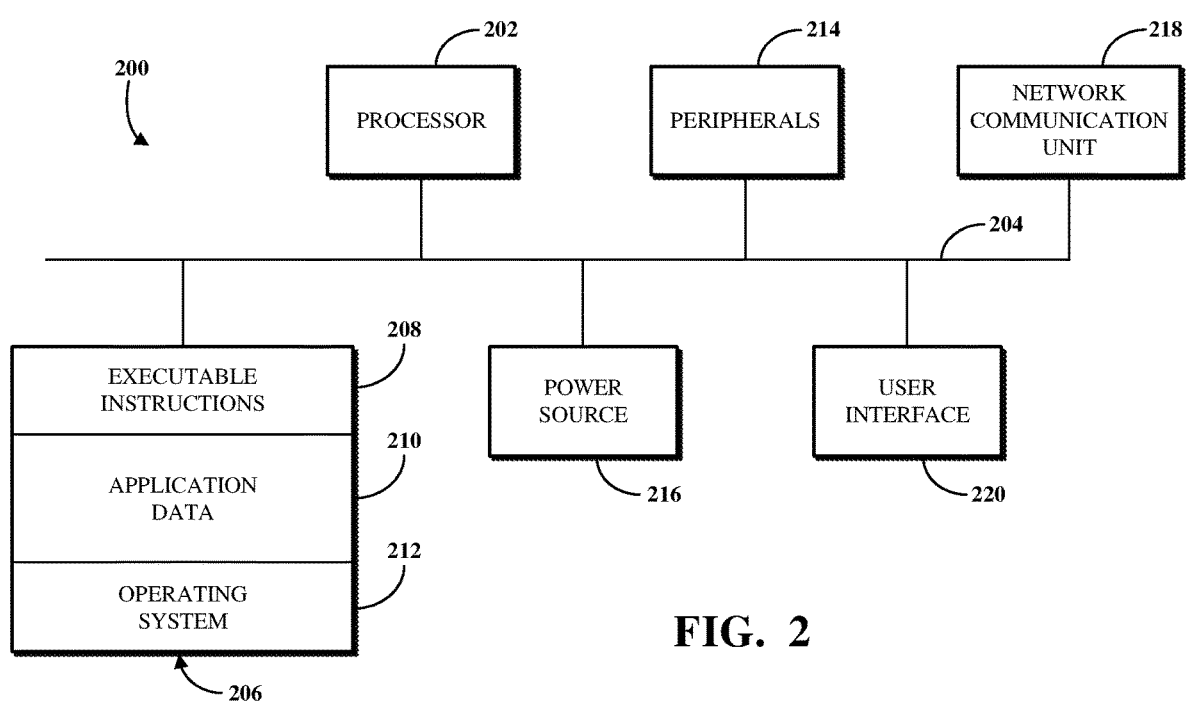
FIG. 2 is a block diagram of an example internal configuration of a computing device of an electronic computing and communications system.

As used herein, the term "component" can refer to a hardware component (e.g., infrastructure, such as a switch, router, server, modem, processor, I/O interface, memory or storage, power supply, biometric reader, media reader, or the like, or combinations thereof) or a software component (e.g., software, such as a platform application, module, routine, firmware process, or other instructions executable by or in connection with one or more hardware components, or the like, or combinations thereof). A component can also refer to a computing feature such as a document, model, plan, socket, virtual machine, or the like, or combinations thereof. A component, such as a hardware component or a software component, can refer to a physical implementation (e.g., a computing device, such as shown in FIG. 2) or a virtual implementation (e.g., a virtual machine, container, or the like that can, for example, execute on a physical device and mimic certain characteristics of a physical device) of one or more of the foregoing.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as a database node 118 executing on the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as the database node 118, which can be accessible by software executed on the application node 114. A database implemented by the database node 118 may be a relational database management system (RDBMS), an object database, an XML database, CMDB, a management information base (MIB), one or more flat files, other suitable non-transient storage mechanisms, or a combination thereof. By way of non-limiting example, the system 100, in some implementations, can include an XML database and a CMDB. While limited examples are described, a database implemented using the database node 118 can be configured as or comprise any suitable database type. Further, the system 100 can include one, two, three, or any suitable number of databases configured as or comprising any suitable database type or combination thereof.

In some implementations, a database implemented using the database node 118 can be configured as or comprise a CMDB. A CMDB can comprise a plurality of CIs, attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database node 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., implemented using the database node 118), tables, other suitable information sources, or portions or combinations thereof may be stored, managed, or otherwise provided by one or more of the elements of the system 100 other than the database server 116, such as the client 104 or the application server 112.

In some implementations, a customer instance, which may also be referred to as an instance of platform software, can be implemented using one or more application nodes 114 and one or more database nodes 118. For example, the one or more application nodes 114 can implement a version of the platform software, and databases implemented by the one or more database nodes 118 can store data used by the version of the platform software. The customer instance associated with the customer 102 may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node 118, such as wherein the database node 118 includes separate catalogs or other structure for separating the data used by platform software of a first customer and platform software of a second customer.

Some or all of the systems and techniques described herein can operate or be executed on or by the servers associated with the system 100. For example, one or more application nodes 114 and one or more database nodes 118 can implement a management system that tests entry points included in a service model using protocols associated with those entry points and process events generated based on the tests. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as implemented by the database node 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary Java Virtual Machine (JVM); or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as random access memory (RAM), storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to perform a discovery process based on an initial entry point of a computerized service, generate a service model based on results of the discovery process, test at least one entry point included in the service model using at least one protocol associated with the at least one entry point, and process an event generated based on the test.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
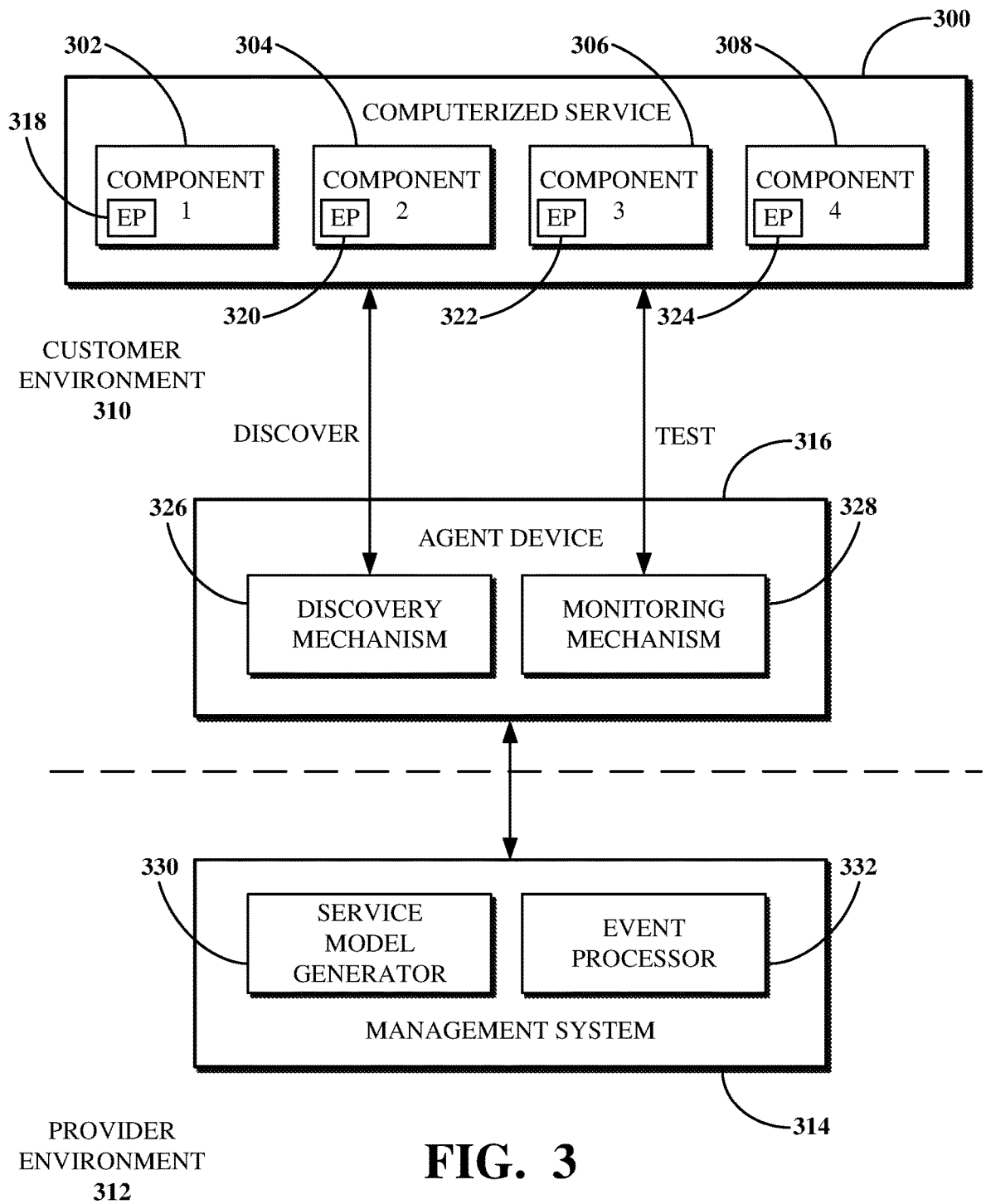
FIG. 3 is a block diagram of an example of a system for monitoring a computerized service including interconnected components within a computer network.

FIG. 3 is a block diagram of an example of a system for monitoring a computerized service 300 including interconnected components 302, 304, 306, and 308 within a computer network. The system includes a customer environment 310 and provider environment 312. The customer environment 310 can refer to, for example, the customer 102 shown in FIG. 1. The customer environment 310 can include one or more computer networks. The customer environment 310 can include hardware and software components under the partial or total control of the customer, such as the components 302, 304, 306, and 308.

The components 302, 304, 306, and 308, or other components under the partial or total control of the customer environment 310, can be hardware devices operating at a physical location controlled by the customer, software executing on such a hardware device, software executing on another device operating at physical locations not controlled by the customer (e.g., cloud services executing on server devices of a third-party Software-as-a-Service (SaaS) computing provider environment), virtual machines implementing software, or the like, or a combination thereof.

The computerized service 300 can use the components 302, 304, 306, and 308 to provide a web application, an email service, or other software services to users of the customer environment 310. For example, the computerized service 300 can provide a web page associated with the customer environment 310. The component 302 can be a Nginx® load balancer for directing requests for a web address at which the web application is accessible to an appropriate web server configured to process those requests, such as by loading a web page associated with the web address. The component 304 can be a Tomcat® web server that receives the requests from the Nginx load balancer and queries data used to load the web page from a database. The components 306 and 308 can be separate Oracle® database servers that operate databases to which the Tomcat web server can send the queries. In another example, the computerized service 300 can provide a virtual machine instance within the customer environment 310. The component 302 can be a JVM. The component 304 can be application software operating within the JVM. The component 306 can be a server device on which the application software executes. The component 308 can be database software executing on the server device.

The provider environment 312 includes software and hardware controlled by a computing provider, such as a PaaS or Software-as-a-Service (SaaS) computing provider. The provider environment 312 can refer to, for example, the datacenter 108 shown in FIG. 1, servers operating at the datacenter 108, software executing on the servers, or the like, or a combination thereof. The provider environment 312 includes a management system 314 that can be used to manage one or more computer networks of the customer environment 310. For example, the management system 314 can include hardware and/or software components for implementing one or more Information Technology Service Management (ITSM) tools, ITOM tools, or the like, or combinations thereof.

The functionality of the management system 314 can be provided as part of a PaaS or SaaS computing service implemented by components of the provider environment 312, on-premises components within the customer environment 310, or a combination thereof. For example, the management system 314 can include an instance of platform software executed within the provider environment 312. The instance of platform software can be implemented, for example, using one or more application nodes or database nodes, such as the application node 114 or the database node 118 shown in FIG. 1

The customer environment 310 can be bounded by firewalls, routers, or other devices that separate customer-controlled networks and devices from external networks and devices, such as connections to the Internet or components controlled by third parties. For example, the customer environment 310 can include a firewall that prevents components of the provider environment 312 from accessing components of the customer environment 310. As such, the customer environment 310 includes an agent device 316 for facilitating the communication and movement of data between hardware operating or software executing outside of the customer environment 310 (e.g., outside of a computer network of the customer environment 310) and hardware operating or software executing within the customer environment 310. The agent device 316 is a computing device, for example, the computing device 200 shown in FIG. 2.

Agent software executing on the agent device 316 can permit communication between components of the provider environment 312 and the customer environment 310, for example, by initiating a connection from within the customer environment 310 to the provider environment 312 using Hypertext Transfer Protocol (HTTP), as permitted by a firewall of the customer environment 310. The agent device 316 can thus be used for operations directed by the management system 314 within the customer environment 310, such as for discovering components of computerized services of the customer environment 310 (e.g., the components 302, 304, 306, and 308 of the computerized service 300) and testing entry points associated with those components (e.g., entry points 318, 320, 322, and 324, described below). For example, once the connection between the customer environment 310 and the provider environment 312 is opened, data can be transmitted from the agent device 316 to the management system 314 or from the management system 314 to the agent device 316.

The agent device 316 can receives events associated with a computer network of the customer environment 310 from event sources associated with the computer network. The event sources can, for example, be monitoring tools that identify and/or collect the events, such as by monitoring ones of the components 302, 304, 306, and 308. Examples of event sources can include, but are not limited to, Netcool®/OMNIbus® ObjectServers and Impact Servers, Microsoft® System Center Operations Manager servers, and Solarwinds® Log & Event Manager servers. An event source may, for example, be software hosted on a client device of the customer environment 310. Alternatively, an event source may be a client device.

An event source may establish a connection to the agent device 316 for transmitting data indicative of an event to the agent device 316. The agent device 316 can then use the Internet or another network to transmit the event messages to the management system 314. For example, the agent device 316 can open a connection to the management system 314. The agent device 316 can use the open connection to transmit data indicative of the event received from the event source to the management system 314. For example, the agent device 316 can push the data indicative of the event to the management system 314 for processing, such as without first receiving a request for that from the management system 314.

The agent device 316 includes a discovery mechanism 326 and a monitoring mechanism 328. One or both of the discovery mechanism 326 or the monitoring mechanism 328 can be implemented on the agent device 316. For example, the discovery mechanism 326 and the monitoring mechanism 328 can include software transmitted from the management system 314 for performing operations initiated by the agent device 316. Alternatively, one or both of the discovery mechanism 326 or the monitoring mechanism 328 can be implemented within the management system 314. For example, the management system 314 can transmit commands for invoking functionality of one or both of the discovery mechanism 326 or the monitoring mechanism 328 using the agent device 316.

The discovery mechanism 326 includes functionality for performing a discovery process against the computerized service 300. For example, the discovery process can be a top-down (e.g., contextual) discovery process performed against interconnected components of the computerized service, for example, the components 302, 304, 306, 308. For example, a top-down discovery process can be initialized using an initial entry point that provides a user with access to the computerized service. The initial entry point can be used, for example, to identify a component of the computerized service that discovery should be performed against, an indication of one or more discovery probes to be transmitted to perform the discovery against that component, or the like, or a combination thereof. For example, the initial entry point can be an HTTP link. The HTTP link can include a host that identifies the component to be discovered. The initial entry point can be used to determine what discovery probe is to be used to identify the software executing on the host. Executing that discovery probe may include transmitting a request to a management interface of the component to be discovered (e.g., Secure Shell (SSH), Windows Management Instrumentation (WMI), or the like) to obtain information relating to the entry point and other entry points used by the component to process requests made to the initial entry point (e.g., for using the computerized service).

The discovery mechanism 326 can perform the discovery process based on an initial entry point of the computerized service 300. An initial entry point can provide a user with access to the computerized service 300. For example, the initial entry point of a web-based email service or a ServiceNow instance may be a URI. The initial entry point of the computerized service 300 may be obtained from an administrator or other user of the customer environment 310 who initiates or otherwise configures a top-down discovery process for the computerized service 300. An example entry point to a ServiceNow instance is http://testinstance.servicenow.com/. For example, the initial entry point of the computerized service 300 can be one of the entry points 318, 320, 322, 324.

The discovery mechanism 326 can transmit results of the discovery process to the management system 314. The discovery mechanism 326 is further described below with respect to FIG. 4. Implementations of top-down discovery processes are further described in U.S. Pat. No. 9,215,270, which is incorporated herein in its entirety.

The management system 314 can generate a service model based on the results of the discovery process. For example, the management system 314 can include a service model generator 330 configured to generate service models based on data received from the agent device 316 (e.g., using the discovery mechanism 326). The service model generated based on the results of the discovery process can include indications of the components 302, 304, 306, 308 of the computerized service 300 and indications of entry points associated with those components 302, 304, 306, 308. The indicated entry points can include, for example, the initial entry point used by the discovery mechanism 326 to perform the discovery process and at least one additional entry point used for communication between ones of the components 302, 304, 306, 308.

The monitoring mechanism 328 includes functionality for monitoring the components of a service model generated based on the computerized service 300 (e.g., by the service model generator 330). For example, the monitoring mechanism 328 can monitor the components 302, 304, 306, 308 to determine a risk that one or more of those components may not function properly (e.g., because of a slow response time, high CPU usage, high disk usage, low memory availability, or the like) or a health of the service model indicating that the computerized service 300 may not function properly (e.g., because of a disrupted connection to or within the computerized service 300, such as due to a power failure, hardware failure, network failure, or the like). The monitoring mechanism 328 can monitor the components of the service model by testing entry points included in the service model (e.g., at least one of the entry points 318, 320, 322, and 324) using protocols associated with respective ones of those entry points. The monitoring mechanism 328 is further described below with respect to FIG. 5.

The management system 314 can process events generated based on a test (e.g., performed using the monitoring mechanism 328). For example, the management system 314 can include an event processor 332 configured to process events generated based on a test of one or more of the entry points 318, 320, 322, and 324. The event processor 332 receives data generated based on a test of one or more of the entry points 318, 320, 322, and 324 and transmitted from the agent device 316. For example, the agent device 316 can use an open channel to the management system 314 to transmit the data to the event processor 332, for example, responsive to the test. The data generated based on the test can be data usable by the event processor 332 to generate one or more events. Alternatively, the data generated based on the test can be one or more events usable by the event processor 332.

The event processor 332 can process the data generated based on a test of one or more of the entry points 318, 320, 322, and 324 to determine an effect of an event associated with the data on one or more of the components 302, 304, 306, and 308. For example, the event processor 332 can use event rules defined at the management system 314 to generate an alert based on the event. An event rule can indicate how to convert all or a portion of data indicative of the event into an alert for the customer environment 310. For example, an alert generated by the event processor 332 can indicate a computer network issue to be resolved based on the event, for example, a disrupted connection to one or more of the components 302, 304, 306, and 308. The management system 314 can then perform an impact calculation operation against the service model based on the alert, for example, to determine an effect of the event on one or more of the components 302, 304, 306, and 308. The impact calculation may effectively represent a status of the computerized service based on one or more metrics determined during a test of the entry points 318, 320, 322, 324.

Implementations of the system depicted in FIG. 3 can include additional, less, or combined functionality as compared to that described above, or functionality other than that described above, or combinations thereof. In some implementations, the management system 314 can include a dashboard including graphical user interfaces transmittable to a client device (e.g., of the customer environment 310). For example, the dashboard can include functionality for dynamically identifying a service model associated with an event processed by the event processor 332. For example, the dashboard can identify a service model based on one or more components affected by an alert generated based on the event. The dashboard can be configured to reflect information about certain service models in place of others, for example, according to a configurable priority order of the service models of the customer environment 310.

A graphical user interface of the dashboard may include a map of the components of the service model that are under test by the monitoring mechanism 328. For example, the graphical user interface can include a hierarchical view of the service model. A component under test by the monitoring mechanism 328 can be reflected in a different color, format, or the like. A graphical user interface of the dashboard may include one or more of a risk definition or a health definition for the computerized service 300. The risk definition can indicate whether the one or more components 302, 304, 306, 308 of the computerized service 300 is not functioning properly (e.g., because of a slow response time, high CPU usage, high disk usage, low memory availability, or the like). The health definition can indicate whether the computerized service 300 itself is not functioning properly (e.g., because of a disrupted connection to or within the computerized service 300, such as due to a power failure, hardware failure, network failure, or the like). The risk definition or the health definition can be reflected, for example, within a map of the components of the service model.

A graphical user interface of the dashboard may include a first graphical display area including tiles or bubbles associated with a service model and a second graphical display area including alerts generated based on event associated with that service model. For example, the tiles or bubbles can indicate one or more components of the service model. The juxtaposition of the first and second graphical display areas can map changes in statuses or configurations within the service model to the corresponding components affected thereby. The tiles or bubbles of the first graphical display area can be interacted with (e.g., by clicking with a mouse) to provide detailed information about the components. For example, the detailed information can include discovered attributes of the components, an entry point associated with the component, an indication of a status of the component, or the like, or a combination thereof. A configuration of the tiles or bubbles may change based on a severity of an alert generated for the components. For example, if an alert has a critical severity for a first component, a tile representing that first component may be colored in red to indicate the critical severity. In another example, if the alert has a minor severity, the tile may be colored in yellow.

In some implementations, the agent device 316 can be omitted. For example, the management system 314 may be installed as on-premises software within the customer environment 310. In such implementations, the actions performed by the agent device 316 (e.g., using the discovery mechanism 326 or the monitoring mechanism 328) can be performed by the management system 314 or omitted, as applicable. In some implementations where the agent device 316 is omitted, actions of one or both of the discovery mechanism 326 or the monitoring mechanism 328 can be performed by a server other than a server on which the management system 314 is implemented.

In some implementations, the monitoring mechanism 328 can be configured to repeat a test of the entry points 318, 320, 322, 324. For example, the monitoring mechanism 328 can include a timetable, which may, for example, be configured at the management system 314. The timetable, for example, can indicate to repeat the test at the expiration of a definite time interval (e.g., every two minutes). The management system 314 can transmit the timetable to the agent device 316 along with the monitoring mechanism 328. Alternatively, such as where the timetable is configured after monitoring mechanism 328 is transmitted to the agent device 316, the management system 314 can transmit update instructions to the agent device 316 for updating the monitoring mechanism 328 according to the timetable.

In some implementations, there may be multiple agent devices within the customer environment 310. For example, the customer environment 310 can be segmented into multiple computer networks, and each computer network can include an agent device. The management system 314 may maintain records indicative of the agent devices that are used to discover components of the customer environment 310. For example, the management system 314 can be configured to restrict an agent device from testing an entry point 318, 320, 322, 324 where a discovery mechanism of a different agent device discovered the component associated with that entry point 318, 320, 322, 324.

In some implementations, the management system 314 can include functionality of a Representational State Transfer (ReST) application programming interface (API) for storing event messages received from the agent device 316. For example, the management system 314 can specify a ReST endpoint associated with a database or like table used to store data generated based on a test of one or more of the entry points 318, 320, 322, and 324 until they is processed. For example, the management system 314 can store that data until it an event associated therewith is processed, such as by the event processor 332. The functionality of the management system 314 for storing the data generated based on a test of one or more of the entry points 318, 320, 322, and 324 can be implemented using the event processor 332 or another aspect of the management system 314.

In some implementations, an edge encryption server (not shown) or like component can encrypt data generated, received, or otherwise identified by the agent device 316 before it is transmitted to the management system 314. For example, the edge encryption server can be a proxy server within the customer environment 310. The agent device 316 can transmit data indicative of a test of one or more of the entry points 318, 320, 322, and 324 to the edge encryption server for encryption, such as using public key encryption, tokenization, or like techniques. The edge encryption server can transmit the encrypted data back to the agent device 316 before it is transmitted to the management system 314. Alternatively, the edge encryption server may be configured to transmit the encrypted data to the management system 314.

In some implementations, the management system 314 can include functionality for enabling or disabling tests of the entry points 318, 320, 322, 324. For example, the management system 314 can receive a command (e.g., from a client device of the customer environment 310) to enable the monitoring mechanism 328 to test the entry points 318, 320, 322, 324 or to disable the monitoring mechanism 328 to restrict it from testing the entry points 318, 320, 322, 324. In another example, the management system 314 can receive a command to enable or disable tests by the monitoring mechanism 328 with respect to a subset of the entry points 318, 320, 322, 324. For example, the monitoring mechanism 328 can be configured to test a subset of the entry points 318, 320, 322, 324 that correspond to a particular service model, entry point type, or CI.

Figure 4:
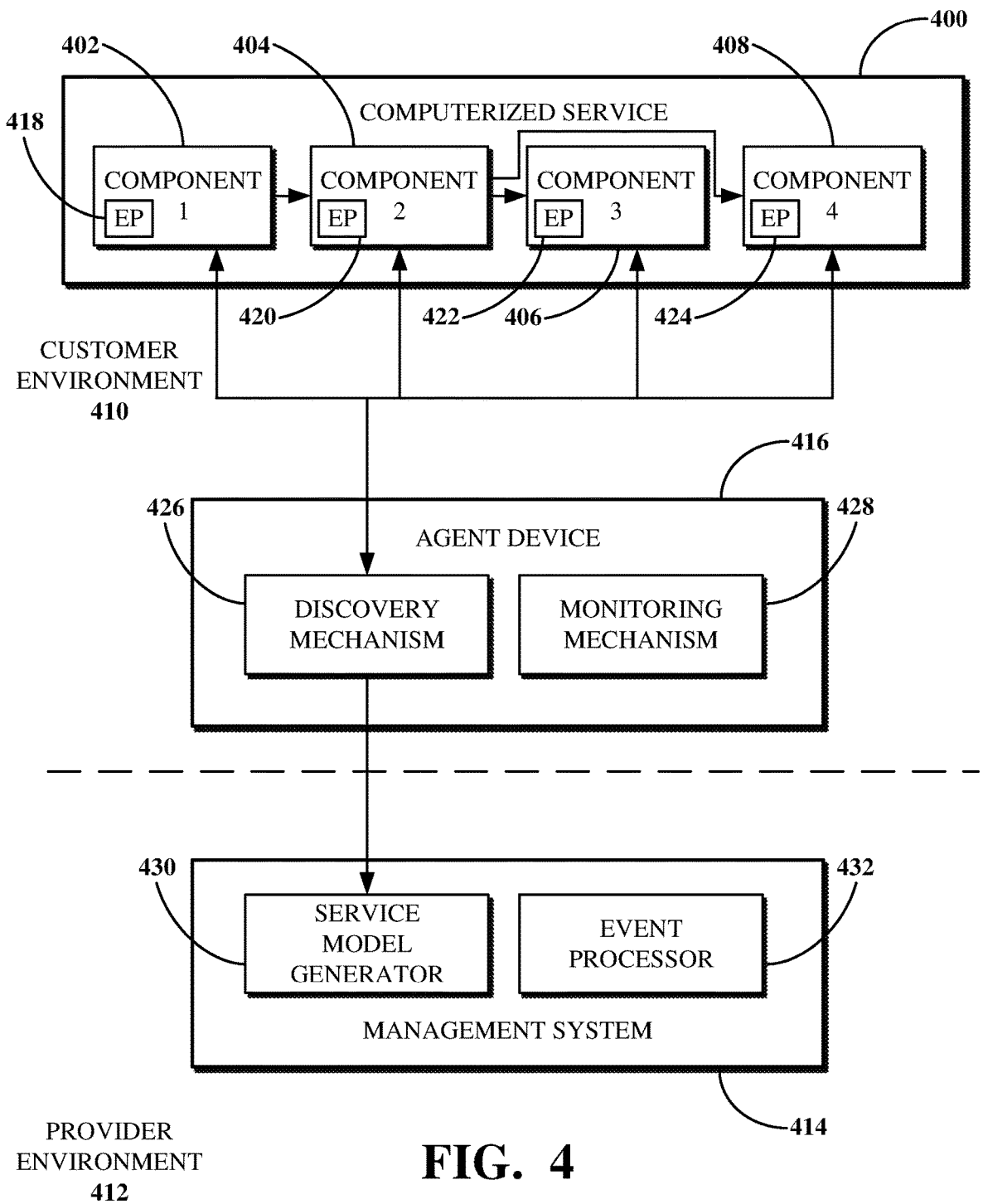
FIG. 4 is a block diagram of an example of a system for performing a discovery process against components of a computerized service and generating a service model based on results of the discovery process.

FIG. 4 is a block diagram of an example of a system for performing a discovery process against components 402, 404, 406, and 408 of a computerized service 400 and generating a service model based on results of the discovery process. The computerized service 400 and the components 402, 404, 406, and 408 may, for example, respectively be the computerized service 300 and the components 302, 304, 306, and 308 shown in FIG. 3. The system includes a customer environment 410 and provider environment 412, which may, for example, respectively be the customer environment 310 and the provider environment 312 shown in FIG. 3. The components 402, 404, 406, 408 may communicate with a management system 414 of the provider environment 412 using an agent device 416 of the customer environment 410. The management system 414 and the agent device 416 may, for example, respectively be the management system 314 and the agent device 316 shown in FIG. 3.

The agent device 416 includes a discovery mechanism 426 and a monitoring mechanism 428, which may, for example, respectively be the discovery mechanism 326 and the monitoring mechanism 328 shown in FIG. 3. The discovery mechanism 426 can include instructions for performing a discovery process against software and/or hardware in the customer environment 410, such as the components 402, 404, 406, 408.

The management system 414 can use the discovery mechanism 426 to perform a discovery process based on an initial entry point of the computerized service 400 by transmitting, for example, a command or a discovery probe to the discovery mechanism 426 to initiate the discovery process. For example, the management system 414 may include a management server (not shown) used to configure the discovery process for the computerized service 400. The management server can initiate a discovery process of the computerized service 400 by transmitting a command to initiate the discovery process to the discovery mechanism 426.

The command transmitted from the management server may, for example, indicate the initial entry point of the computerized service 400. For example, the command can be a command to execute a discovery probe against a component associated with the initial entry point. The discovery probe can reference one or more attributes of the component, for example, an IP address, a host name, or the like. The management server can transmit the discovery probe to execute against that component to the agent device 416 for use by the discovery mechanism 426. Alternatively, the discovery probe to execute against that component may already be stored at the agent device 416 or otherwise in a database accessible by the agent device 416. The command transmitted from the management server can include an indication of the discovery probe to execute. For example, the discovery probe and/or the component against which to execute the discovery probe can be identified based on an entry point indicated by the command.

The agent device 416 may, in a default configuration, include the discovery mechanism 426. For example, the agent device 416 may be configured by default to perform a discovery process against the components 402, 404, 406, 408, such as based on a command transmitted from the management system 414 using an opened connection between the agent device 416 and the management system 414. Alternatively, the discovery mechanism 426 can be received at the agent device 416 from the management system 414, for example, using an opened connection between the agent device 416 and the management system 414. For example, the agent device 416 can receive a plugin including the discovery mechanism 426 from the management system 414. The plugin can be installed on the agent device 416 to configure the agent device 416 to process commands received from the management system 414, such as to initiate a discovery process.

The discovery process may, for example, be a top-down discovery process. Performing the discovery process may include the discovery mechanism 426 running one or more discovery probes against the components 402, 404, 406, 408 of the computerized service 400, for example, to identify how those components 402, 404, 406, 408 connect to provide the computerized service 400. The discovery probes may, for example, be received from the management system 414. Steps of a discovery probe can include one or more commands that can be processed by the discovery mechanism 426 to identify attributes of the components 402, 404, 406, 408. The attributes identifiable by processing commands of a discovery probe may, for example, include attributes related to the status, configuration, or connectivity of a component.

A discovery probe can be configured to communicate with a component 402, 404, 406, 408 of the computerized service 400 using a compatible language or interface, such as SSH, WMI, or the like. For example, a step can be implemented using SSH and the command ipconfig for identifying network address or authentication attributes (e.g., credentials) for a subject component being discovered. When the step is processed, the subject component can be logged into using SSH for the discovery mechanism 426 to retrieve further attribute information about the subject component using the discovery probe, such as by executing other commands against or retrieving a file associated with the component.

The discovery mechanism 426 can perform a discovery process in the customer environment 410 based on an initial entry point of the computerized service 400, such as one of the entry points 418, 420, 422, 424, which may, for example, be the entry points 318, 320, 322, 324 shown in FIG. 3. A discovery process may begin with a first component (e.g., one of the components 402, 404, 406, 408) that is associated with or otherwise referenced by the initial entry point. Performing the discovery process can include transmitting a discovery probe to that first component. The discovery probe can reference one or more attributes of the initial entry point of the first component (e.g., a host name, protocol, port, URI, or the like). For example, the entry point 418 can be the initial entry point into the computerized service 400. The discovery mechanism 426 can then transmit a discovery probe to the component 402 associated with the entry point 418. For example, the entry point 418 can be used to identify a host name or IP address of the component 402 and the discovery probe can use credentials for the component 402 to log into the component 402, such as by using SSH or a like management interface. The discovery probe can then identify values of attributes of the component 402 (e.g., an operating system version, a software version, or the like).

The discovery probe can also search for other components that the component 402 connects to for providing the computerized service 400. For example, the discovery probe can examine a configuration of software that receives requests to the entry point 418 to determine what that software depends on (e.g., the entry point 420). The discovery process can then determine entry points associated with or otherwise referencing those other components of the computerized service 400. The discovery probe can identify one of those other components based, for example, on the, entry point 420, and search that component for connections to other components of the computerized service 400. This process may repeat until no further components are discovered.

For example, the discovery probe can identify attributes of another entry point of the computerized service 400 using the information discovered for the component 402. The discovery probe can identify that the component 402 communicates data to the entry point 420. The discovery mechanism 426 can direct that discovery probe (or another discovery probe, as applicable) to identify a component referenced by the entry point 420 to discover the component 404. The entry points 422 and 424 can then be identified using the information discovered for the component 404, and those entry points 422 and 424 can be used to respectively discover the components 406 and 408, which connect to the component 404.

For example, where the computerized service 400 provides a web page associated with the customer environment 410 (e.g., as described above with respect to FIG. 3), a client within or otherwise connected to the customer environment 410 can transmit a request to access the web page. The request for the web page can include a request for a Uniform Resource Locator (URL) of the web page. The URL can reference the entry point 418. A Nginx® load balancer (e.g., the component 402) can direct the URL to a Tomcat® web server (e.g., the component 404) by referencing the entry point 420. The Tomcat® web server can then query a database for data used to load the web page stored at a first Oracle® database server (e.g., the component 406) or a second Oracle® database server (e.g., the component 408) by referencing one of the entry point 422 or the entry point 424.

With reference to the functionality of the discovery mechanism 426, a discovery process performed using the discovery mechanism 426 can use the connections between ones of the components 402, 404, 406, and 408 to identify the entry points 420, 422, and 424 based on a discovery probe transmitted to the component 402 associated with the entry point 418. The discovery mechanism 426 can thus identify attributes of the Nginx® load balancer, the Tomcat® web server, and the Oracle® database servers.

The management system 414 can include a service model generator 430 and an event processor 432, which may, for example, respectively be the service model generator 330 and the event processor 332 shown in FIG. 3. Results of the discovery process can be transmitted to the service model generator 430. For example, the results of the discovery process can include information about attributes of the components 402, 404, 406, 408 identified using the discovery probes transmitted to ones of the components 402, 404, 406, 408. The service model generator 430 can generate a service model based on results of the discovery process.

The management system 414 can include or otherwise access a database, such as a CMDB, including records of components of the customer environment 410. For example, a CMDB accessible by the management system 414 can include CIs representative of components of the customer environment 410 that have been identified, such as using one or more discovery probes. A CI can include attributes of the corresponding component identified using a discovery probe. For example, a discovery probe for an Apache Tomcat® web server (Tomcat or "Tomcat web server") can identify attributes of the Tomcat, including a Web Application Archive (WAR) file executed by the Tomcat, an IP address of the Tomcat, a version of Linux operating the Tomcat, or the like, or combinations thereof. A CI can then be generated for the Tomcat (or, if a CI therefor already exists, it can be updated) within the CMDB using the attribute information identified using that discovery probe.

A service model generated based on results of the discovery process performed by the discovery mechanism 426 can include indications of the components 402, 404, 406, and 408 of the computerized service 400 that were discovered by the discovery process. For example, the service model can include or reference CIs representative of respective ones of the components 402, 404, 406, 408, and those CIs can include information about attributes of those components 402, 404, 406, 408 identified using one or more discovery probes. Generating the service model can include associating ones of the entry points 418, 420, 422, 424 with the ones of the components 402, 404, 406, 408. For example, a CI can include a respective one of the entry points 418, 420, 422, 424 that references the corresponding component 402, 404, 406, 408. A CI generated for the component 402 would include a reference to the entry point 418, a CI generated for the component 404 would include a reference to the entry point 420, and so on. The service model generator 430 can include functionality for storing a service model after it is generated. For example, the service model generator 430 can store a service model generated based on results of the discovery process against the computerized service 400 within a database accessible by the management system 414.

Implementations of the system depicted in FIG. 4 can include additional, less, or combined functionality as compared to that described above, or functionality other than that described above, or combinations thereof. In some implementations, the agent device 416 may be omitted. For example, the management system 414 can include an on-premises system for managing a model of the customer environment 410. For example, the discovery probes used to identify the components 402, 404, 406, and 408 and the entry points 418, 420, 422, and 424 can be received from software executing independently of a datacenter, such as on-premises software executing within the customer environment 410. The on-premises system can include or otherwise access a database, such as a CMDB, for storing results of the discovery process (e.g., by generating CIs based on those results).

Figure 5:
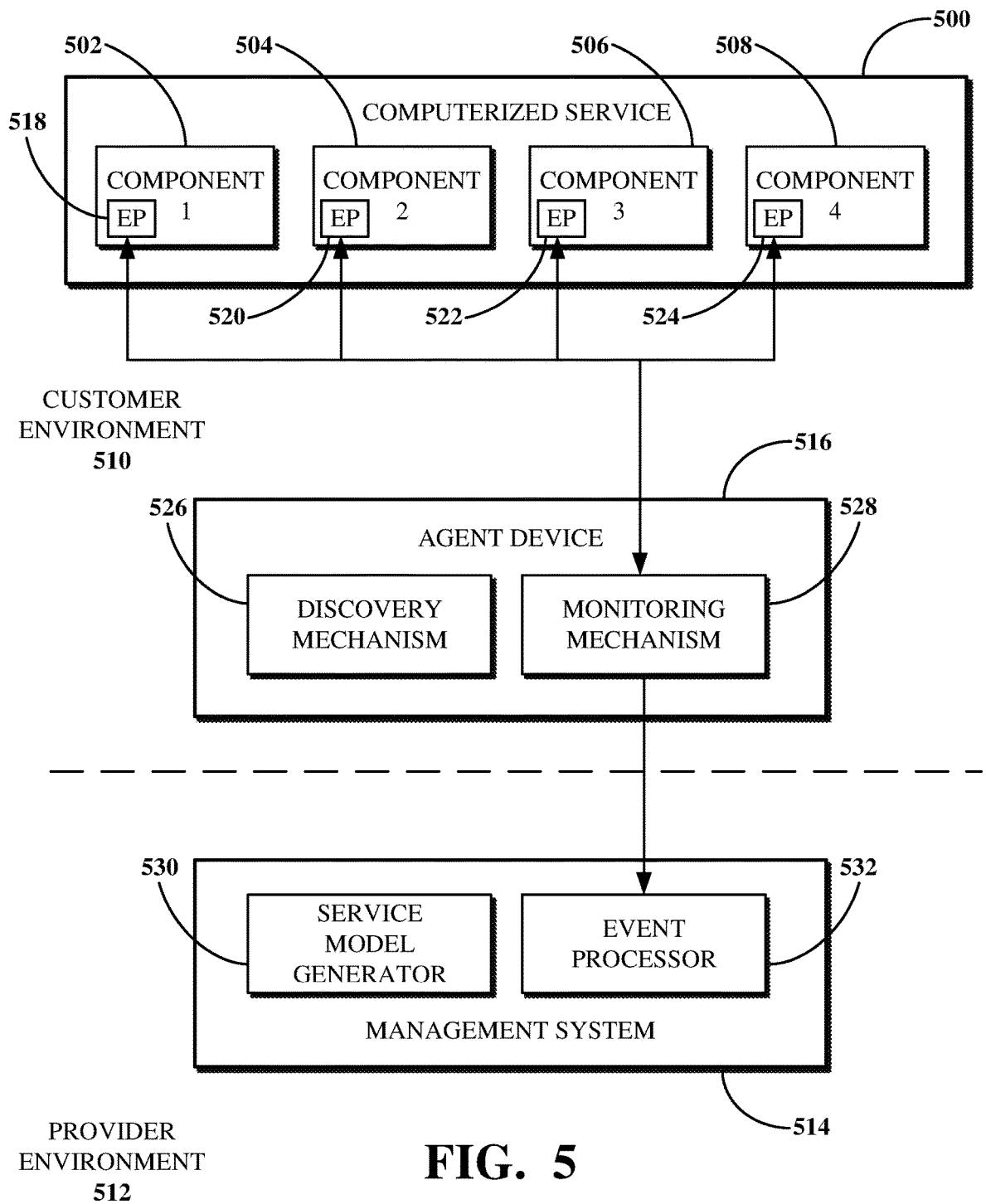
FIG. 5 is a block diagram of an example of a system for testing entry points associated with components of a computerized service and processing an event generated based on the test.

FIG. 5 is a block diagram of an example of a system for testing entry points associated with components 502, 504, 506, and 508 of a computerized service 500 and processing an event generated based on the test. The computerized service 500 and the components 502, 504, 506, and 508 may, for example, respectively be the computerized service 300 and the components 302, 304, 306, and 308 shown in FIG. 3. The system includes a customer environment 510 and provider environment 512, which may, for example, respectively be the customer environment 310 and the provider environment 312 shown in FIG. 3. The components 502, 504, 506, 508 may communicate with a management system 514 of the provider environment 512 using an agent device 516 of the customer environment 510. The management system 514 and the agent device 516 may, for example, respectively be the management system 314 and the agent device 316 shown in FIG. 3.

The agent device 516 includes a discovery mechanism 526 and a monitoring mechanism 528, which may, for example, respectively be the discovery mechanism 326 and the monitoring mechanism 328 shown in FIG. 3. The monitoring mechanism 528 can include instructions for testing entry points included in a service model corresponding to the computerized service 500, such as the entry points 518, 520, 522, and 524, respectively of the components 502, 504, 506, 508. The entry points 518, 520, 522, and 524 may, for example, respectively be the entry points 318, 320, 322, and 324 shown in FIG. 3.

The management system 514 can use the monitoring mechanism 528 to test an entry point included in a service model by transmitting a command to initiate the test to the monitoring mechanism 528. For example, the command can include all or a portion of a service model that was generated based on a discovery process performed against the computerized service 500 from the management system 514. For example, a management server (e.g., as described above with respect to FIG. 4) or another component of the management system 514 can transmit the service model, a subset of the service model, a transformation of the service model, or information based on the service model to the monitoring mechanism 528. The monitoring mechanism 528 can use that service model or other data to identify entry points to be tested. For example, the monitoring mechanism 528 can test an entry point included in the service model after receiving the information about the service model from the management system 514.

The agent device 516 may, in a default configuration, include the monitoring mechanism 528. For example, the agent device 516 may be configured by default to perform a test of ones of the entry points 518, 520, 522, 524, such as after receiving information about the service model generated based on the computerized service 500 from the management system 514 using an opened connection between the agent device 516 and the management system 514. Alternatively, the monitoring mechanism 528 can be received at the agent device 516 from the management system 514, for example, using an opened connection between the agent device 516 and the management system 514. For example, the agent device 516 can receive a plugin including the monitoring mechanism 528 from the management system 514. The plugin can be installed on the agent device 516 to configure the agent device 516 to perform tests of the entry points 518, 520, 522, 524.

The monitoring mechanism 528 can test one or more of the entry points 518, 520, 522, 524 using protocols associated with respective ones of those entry points 518, 520, 522, 524. The monitoring mechanism 528 can test the entry points 518, 520, 522, 524 independently of one another. For example, the entry points 518, 520, 522, 524 may not need to be tested in a particular order, such as an order in which they were discovered. The monitoring mechanism 528 can test an entry point, for example, to determine whether a connection to the component associated with that entry point is available, a response time for responding to requests to access that component meets a threshold, a type of content available at the component matches a type of content available to another component to which that component connects in the computerized service 500, or the like, or a combination thereof.

The monitoring mechanism 528 can be configured to automatically perform tests against ones of the entry points 518, 520, 522, and 524, for example, according to a configurable time interval (e.g., every two minutes) which may be the same or potentially different for each entry point. Alternatively, the monitoring mechanism 528 can test ones of the entry points 518, 520, 522, and 524 responsive to a request or command received, for example, from the management system 514.

A test can be performed to determine a metric with respect to an entry point 518, 520, 522, 524. A metric can refer to a measured value, status, or characteristic of a tested entry point, such as determined based on a response to a test of that entry point. A metric can have a type. Examples of the metric types include availability (e.g., connection status), performance (e.g., response time), accuracy (e.g., content matching), or the like. For example, a metric can indicate a disrupted connection to an entry point associated with a component of a service model. In another example, a metric can indicate a slow response time for accessing a component of a service model associated with an associated entry point. In yet another example, a metric can indicate a content mismatch between first and second components of a service model based on the entry point associated with the second component.

The monitoring mechanism 528 can test an entry point 518, 520, 522, 524 by transmitting a test message to the entry point using a protocol associated with the entry point. For example, an entry point protocol may be, in some implementations, determined from a string identifying the entry point. For example, if the entry point is a URI, the protocol may be identified by the portion of the string in advance of the colon, such as http in the following example: http://host/path. A test message can include a request to access or otherwise connect to a component associated with the entry point using that entry point. Testing the entry point 518, 520, 522, 524 can include measuring or otherwise evaluating a response to the test message. For example, the monitoring mechanism 528 can test an entry point 518, 520, 522, 524 by measuring a length of time used to respond to the test message. In another example, the monitoring mechanism 528 can test an entry point 518, 520, 522, 524 by determining whether the response includes a code indicating that the component associated with the tested entry point is not found.

A metric can be determined based on a response to a test message. Determining a metric based on a response can include determining a response time (e.g., a time that the response took for communication from the respective component to the agent device 516). For example, the time used to send the test message can be subtracted from the total time of the test process to determine the response time.

The test messages are transmitted to ones of the entry points 518, 520, 522, 524 using protocols associated with respective ones of the entry points 518, 520, 522, 524. Examples of protocols used by ones of the entry points 518, 520, 522, 524 may include HTTP, secure HTTP (HTTPS), Structured Query Language (SQL), Java Database Connectivity (JDBC), Session Announcement Protocol (SAP), Advanced Business Application Programming (ABAP), MQ Series, Java Message Service (JMS), Lightweight Directory Access Protocol (LDAP), Telnet, proprietary protocols as may be developed or used, or the like. For example, where the component 506 is an Oracle® database server, the monitoring mechanism 528 can test the entry point 522 by transmitting a test message including a SQL query thereto. In another example, where the component 504 is a Tomcat® web server, the monitoring mechanism 528 can test the entry point 520 by transmitting a test message including an HTTP response time request thereto.

The protocol to use for testing an entry point 518, 520, 522, 524 can be determined based on a service model generated for the computerized service 500. For example, the service model can include or otherwise be associated with CIs generated to represent ones of the components 502, 504, 506, and 508 within a CMDB. A CI generated to represent a component of the computerized service 500 can include attributes such as a port used to communicate data to or from that component. For example, where the component 504 is a Tomcat® web server, the CI representing the component 504 within a CMDB can indicate that the Tomcat® web server uses port 443. The monitoring mechanism 528 can query the CMDB for the port information of that CI to determine to use HTTPS to transmit a test message to the component 504.

The metric type may be determined based on the protocol used to test the entry point. For example, where the protocol is HTTP, the metric type can be determined to refer to a response time for responding to an HTTP connection request. Alternatively, the metric type may be determined based on a response to a test message. For example, where the response includes a code indicating that the component associated with the tested entry point is not found, the metric type can be determined to refer to a connection status for the component associated with the entry point.

The monitoring mechanism 528 may not use credentials of a component to test an entry point associated therewith. For example, the test of the entry point can be a test to verify that a port used by the entry point is open (e.g., using telnet or the like). Alternatively, the monitoring mechanism 528 may use credentials of a component to test an entry point associated therewith. For example, the monitoring mechanism 528 may require the credentials to verify that an actual connection exists to a port used by the entry point (e.g., by testing for an open SQL connection or the like).

An administrator or other user of the customer environment 510 can select a subset of the entry points to be tested using the monitoring mechanism 528. For example, a subset of the entry points can be selected based on an entry point type or a CI type. An entry point type can refer to a generic form of an entry point (e.g., omitting a host of the component associated with the entry point). A CI type can refer to a type of component represented by the CI. For example, the monitoring mechanism can be configured to only test entry points associated with web servers, routers, hypervisors, or the like. The administrator or other user may be permitted to select more than one entry point type or CI type to define the subset to be tested.

The management system 514 can include a service model generator 530 and an event processor 532, which may, for example, respectively be the service model generator 330 and the event processor 332 shown in FIG. 3. An event generated based on the test performed by the monitoring mechanism 428 can be transmitted to the event processor 532. For example, the agent device 516 can include functionality for generating an event based on a metric determined by testing an entry point 518, 520, 522, 524 using the monitoring mechanism 528. The event processor 532 can process the event to determine an effect of the event on one or more of the components 502, 504, 506, 508 of the computerized service 500. For example, the event processor 532 can generate an alert based on the event. The management system 514 can perform an impact calculation operation against the service model corresponding to the computerized service 500 based on the alert.

The event processor 532 can be configured to process all events received from the agent device 516. Alternatively, the event processor 532 can be configured to process an event received from the agent device 516 responsive to a determination that a metric associated with the event breaches a threshold associated with the metric. For example, a threshold can be associated with a metric that indicates a connectivity status of a component using a tested entry point. The threshold can be defined such that a certain number of events (e.g., three) associated with that metric must be received from the agent device 516 within a specified period of time (e.g., ten minutes) before an event associated with that metric is processed. In another example, a threshold can be associated with a metric that indicates a response time for a component using a tested entry point. The threshold can be defined such that an event associated with that metric is processed only if the response time exceeds a specified limit (e.g., half of one second). Alternatively, the agent device 516 (e.g., using the monitoring mechanism or another mechanism) may be restricted from transmitting the event to the management system 514 until the agent device 516 determines that the threshold associated with the metric is breached.

The event processor 532 can generate an alert based on an event by applying the event to an event rule defined for the management system 514. For example, the management system 514 can be configured with one or more event rules for processing different types of events to generate meaningful alert output usable to identify status or configuration changes for components of service models. Alternatively, the event processor 532 can generate an alert based on an event based on statistical dynamic thresholds associated with the event (e.g., based on the type of event, a component associated with the event, a number of times the event has been indicated to the management system 514, or the like).

Implementations of the system depicted in FIG. 5 can include additional, less, or combined functionality as compared to that described above, or functionality other than that described above, or combinations thereof. In some implementations, a determination can be made as to whether to test an entry point 518, 520, 522, 524 before the entry point is tested using the monitoring mechanism 528. For example, the determination can be based on an indication of a status of the service model corresponding to the computerized service 500. The management system 514 can include information reflecting a status of the service model. If the status of the service model indicates that the service model is unavailable (e.g., because one or more components thereof cannot be connected to, such as due to a power, hardware, network, or other failure), the monitoring mechanism 528 may be restricted from testing the entry points of the service model.

In some implementations, the agent device 516 may be omitted. For example, the management system 514 can include an on-premises system for managing a model of the customer environment 410. For example, the test messages transmitted to the entry points 518, 520, 522, and 524 can be transmitted from software executing independently of a datacenter, such as on-premises software executing within the customer environment 510. The on-premises system can include or otherwise access a database, such as a CMDB, for retrieving information about a service model corresponding to the computerized service 500, such as a status of the service model, entry point information for the service model, or the like, or a combination thereof.

In some implementations, the management system 514 (e.g., using the event processor 532 or another module) can store metrics associated with events received from the agent device 516. For example, a database accessible by the management system 514 can include a table for storing performance indicator information (e.g., key performance indicators) associated with the metrics determined based on tests performed using the monitoring mechanism 528. The management system 514 can use the data stored in that table, for example, for performing a dynamic threshold analysis, a historical analysis (e.g., by generating performance graphs), aggregating the data, or the like.

In some implementations, the monitoring mechanism 528 can be configured to adjust a time interval defined for testing ones of the entry points 518, 520, 522, and 524 based on a metric determined based on a previous test thereof. For example, the monitoring mechanism 528 can adjust the time interval differently based on whether the metric corresponds to the health of the service model (e.g., an availability of the service model or the components thereof) or a risk associated with the service model (e.g., a performance issue of the components of the service model, such as due to a slow response time).

For example, where a previous metric relates to the health of the service model, the time interval for testing the corresponding entry point can be adjusted from a first time interval (e.g., every two minutes) to a second time interval (e.g., every thirty seconds). The monitoring mechanism 528 can generate an event based on the metric after a third repeat metric indicates that a connection to an entry point is disrupted (e.g., unavailable). However, if the connection is restored before that third repeat metric is determined, the time interval for testing the corresponding entry point can be readjusted from the second time interval back to the first time interval.

In some implementations, the tests performed by the monitoring mechanism 528 can begin once a service model is generated for the computerized service 500. For example, the functionality of the monitoring mechanism 528 may be enabled for the customer environment 510 by default. An administrator or other user of the customer environment 510 may be permitted to disable the monitoring mechanism 528.

Figure 6:
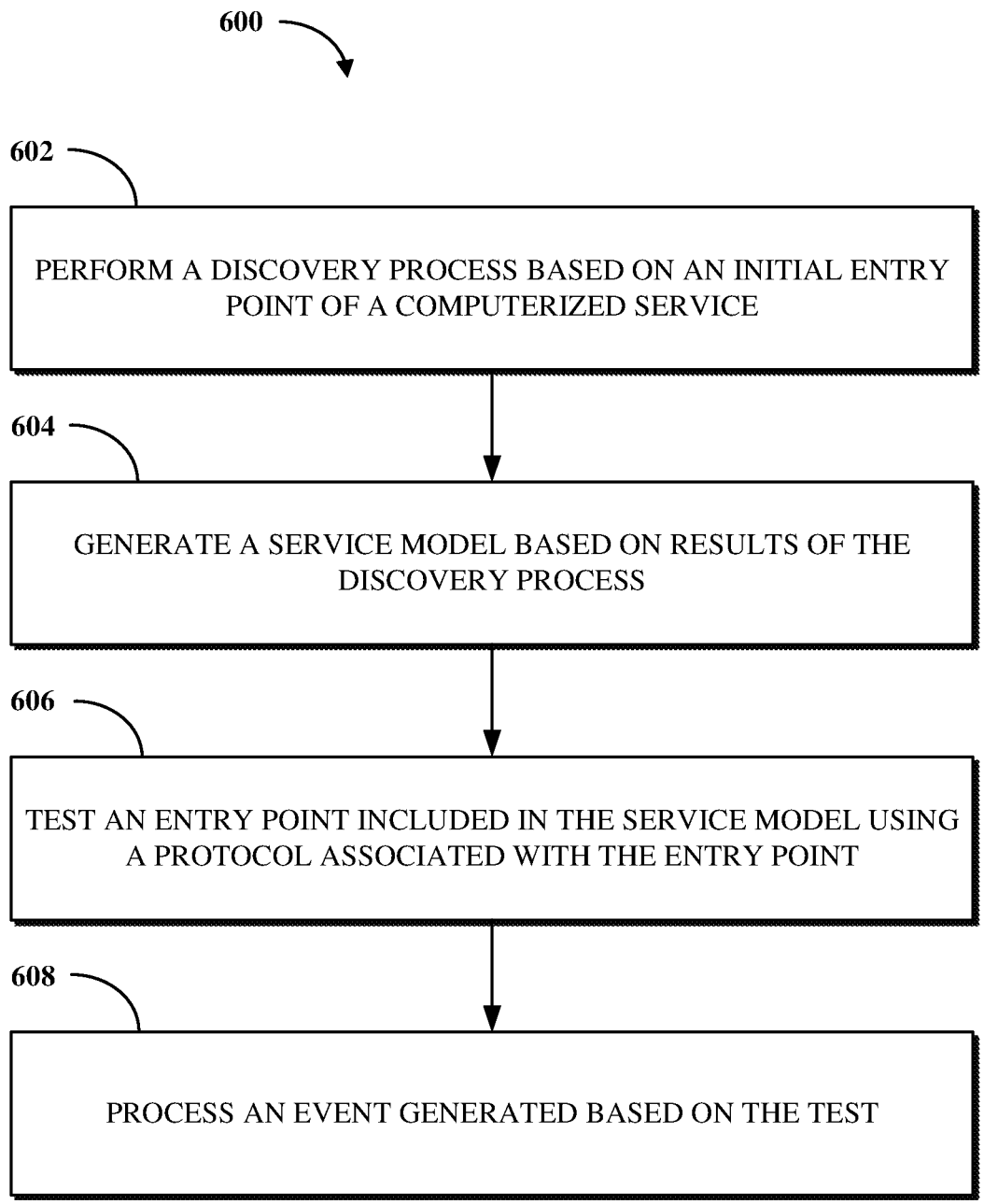
FIG. 6 is a flowchart illustrating an example of a technique for monitoring computerized services including interconnected components within a computer network.
Figure 7:
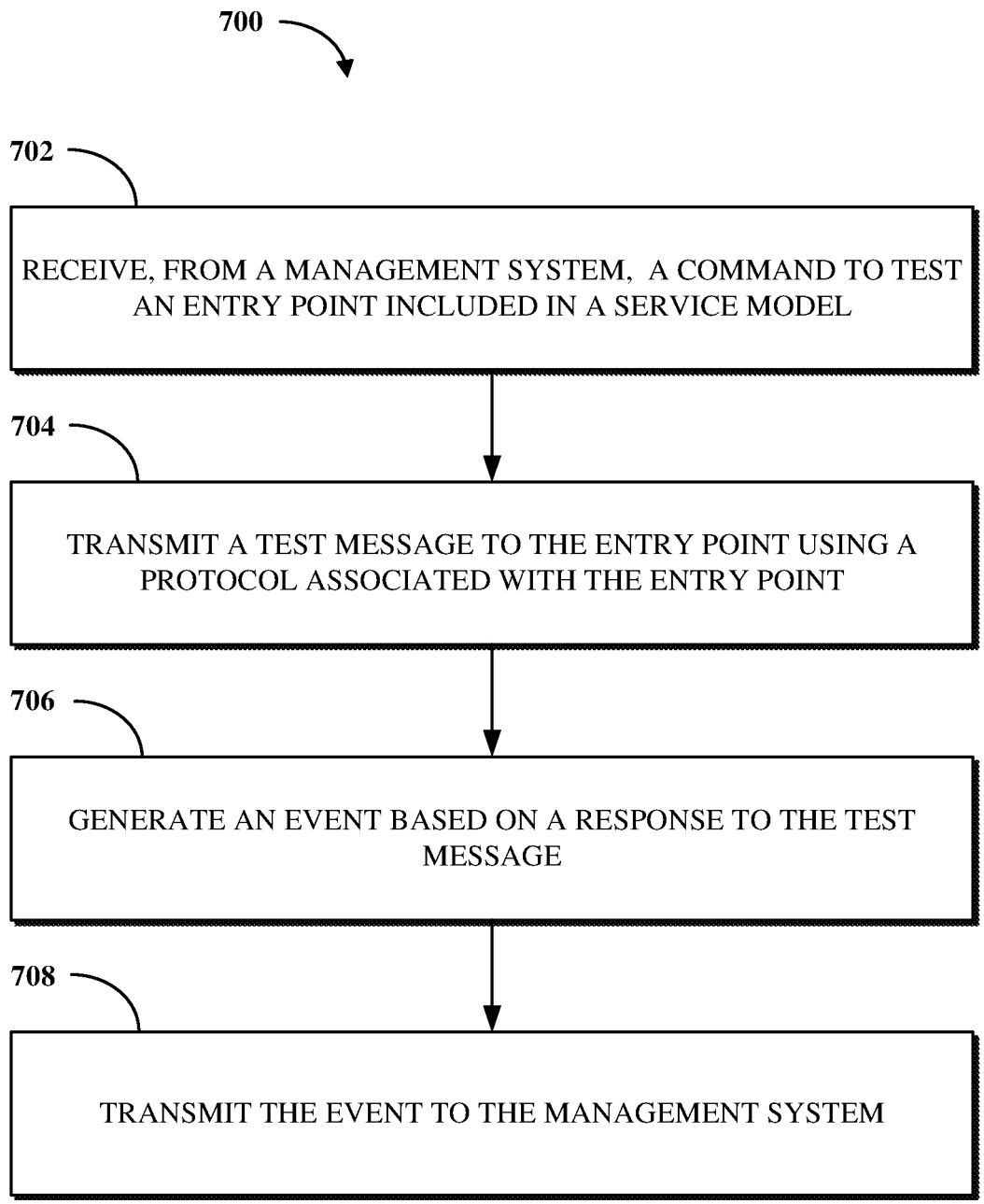
FIG. 7 is a flowchart illustrating an example of a technique for transmitting an event generated based on a response to a test message to a management system.

FIG. 6 is a flowchart illustrating an example of a technique 600 for monitoring computerized services including interconnected components within a computer network. FIG. 7 is a flowchart illustrating an example of a technique 700 for transmitting an event generated based on a response to a test message to a management system. One or both of the technique 600 or the technique 700 can be executed using computing devices, such as the systems, modules, and devices described with respect to FIGS. 1-5. One or both of the technique 600 or the technique 700 can be performed, for example, by executing a machine-readable program or other computer-executable instructions, such as instructions or programs described according to JavaScript, C, or other such instructions. The steps, or operations, of the technique 600, the technique 700, or any other technique, method, process, or algorithm described in connection with the implementations disclosed herein can be implemented directly in hardware, firmware, software executed by hardware, circuitry, or a combination thereof.

Although the technique 600 and the technique 700 are each shown as a series of operations for clarity, implementations of the technique 600, the technique 700, or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

Referring first to FIG. 6, a flowchart illustrating an example of the technique 600 for monitoring computerized services including interconnected components within a computer network is shown. In an implementation, the technique 600 includes performing a discovery process based on an initial entry point of a computerized service via 602, generating a service model based on results of the discovery process via 604, testing an entry point included in the service model using a protocol associated with the entry point via 606, and processing an event generated based on the test via 608.

At 602, a discovery mechanism is used to perform a discovery process against a computerized service. The discovery mechanism can perform the discovery process based on an initial entry point of the computerized service. A customer environment that includes the computerized service can include an agent device. The agent device can include the discovery mechanism. A management system within a provider environment can use the discovery mechanism to perform the discovery process, such as by transmitting a command and/or a discovery probe to the discovery mechanism to initiate the discovery process. For example, the management system may include a management server that transmits the command and/or discovery probe to the discovery mechanism.

The command transmitted from the management server may, for example, indicate the initial entry point of the computerized service. For example, the command can be a command to execute a discovery probe against a component associated with the initial entry point. The discovery probe can reference one or more attributes of the component, for example, an IP address, a host name, or the like. The management server can transmit the discovery probe to execute against that component to the agent device for use by the discovery mechanism. Alternatively, the command transmitted from the management server can include an indication of the discovery probe to execute against that component. For example, the discovery probe may already be stored at the agent device or otherwise in a database accessible by the agent device.

The discovery mechanism can execute a discovery probe against a component referenced by the initial entry point of the computerized service. The discovery probe can determine one or more entry points of the computerized service, such as those associated with one or more other components of the computerized service. For example, a discovery probe executed against a component of the computerized service can search for other components that the component connects to for providing the computerized service. For example, the discovery probe can examine a configuration of software that receives requests to the entry point associated with the software to determine what that software depends on. The discovery process can then determine entry points associated with or otherwise referencing the other components of the computerized service. The discovery probe can identify one of those other components based, for example, on an entry point associated with that component and search that component for connections to other components of the computerized service. This process may repeat until no further components are discovered. The discovery mechanism can use one or more discovery probes to discover the components of the computerized service and the entry points used for communication between ones of those components.

At 604, a service model can be generated based on results of the discovery process performed. For example, the service model can be generated by a service model generator of the management system from which the command to initiate the discovery process is received. The results of the discovery process can indicate the components used to provide the computerized service, the entry points used for communication between ones of those components, other information, or a combination thereof. The service model includes indications of the components of the computerized service and indications of the entry points used by the components, including the initial entry point used to perform the discovery process. Generating the service model can include generating CIs representative of the discovered components of the computerized service. Generating the service model can also include associating ones of the entry points with the ones of the components. For example, a CI generated to represent a discovered component within a CMDB can include an attribute indicating the entry point associated with that component.

At 606, a monitoring mechanism is used to test at least one of the entry points included in the service model. For example, the agent device can include the monitoring mechanism. The management system can use the monitoring mechanism to test the entry points included in the service model, such as by transmitting a command to initiate the test to the monitoring mechanism. For example, the management server of the management system or another component of the management system can transmit the command to the monitoring mechanism.

The command received from the management server can include all or a portion of a service model. For example, the management server or other component of the management system can transmit the service model, a subset of the service model, a transformation of the service model, or information based on the service model to the monitoring mechanism. The monitoring mechanism can use that service model or other data to identify entry points to be tested. For example, the monitoring mechanism can test an entry point included in the service model after receiving the information about the service model from the management system.

The monitoring mechanism can test an entry point included in the service model using a protocol associated with the entry point. For example, information indicative of the service model can be used to identify ports used by respective ones of the components of the service model. The protocol to be used to test an entry point can be identified based on the port. For example, where the port indicated within a CI representing the component within the service model is 443, the protocol to be used to test the entry point associated with the corresponding component is HTTPS.

The monitoring mechanism can transmit a test message to the entry point using the protocol associated with the entry point. The test message can include a request to access or otherwise connect to the component associated with the tested entry point using that entry point. A metric can be determined based on a response to the test message. The metric can reflect a measured value, status, or other characteristic based on the test message. For example, the metric can indicate any of a disrupted connection to a first component of the service model, a slow response time for accessing the first component, and a content mismatch between the first component and a second component of the service model.

The discovery mechanism used at 602 and the monitoring mechanism used at 606 can be implemented on one agent device. For example, the agent device can receive both of a command to perform a discovery process and a command to test an entry point included in a service model. Alternatively, the discovery mechanism used at 602 and the monitoring mechanism used at 606 can each be implemented on different agent devices. For example, a first agent device can receive a command to perform a discovery process and a second agent device can receive a command to test an entry point included in a service model.

At 608, an event generated based on the test is processed. The event can be generated based on a metric determined based on the test. For example, the monitoring mechanism can include functionality for generating an event based on the metric. The event can be transmitted from the agent device to the management system for processing. The management system can process the event upon or after receiving the event from the agent device. Alternatively, the management system can process the event responsive to determining that the metric used to generate the event breaches a threshold associated with the metric. The event can be processed to generate an alert indicative of a status or configuration of one or more components of the service model corresponding to the computerized service. The management system can use the alert to perform an impact calculation operation against the service model.

In some implementations, the technique 600 can include determining whether to test an entry point using an associated protocol based on an indication of a status of the service model. For example, the management system can include information indicative of a status of the service model. If the information indicates that the service model is unavailable, the management system can transmit a command to the agent device to restrict the monitoring mechanism from testing the entry points included in the service model, such as until the status of the service model changes. In some implementations, a test can be performed on a subset of the entry points included in the service model. For example, the subset to be tested can be selected based on an entry point type or a CI type.

Referring next to FIG. 7, a flowchart illustrating an example of the technique 700 for transmitting an event generated based on a response to a test message to a management system is shown. In an implementation, the technique 700 includes receiving a command to test an entry point included in a service model from a management system via 702, transmitting a test message to the entry point via 704, generating an event based on a response to the test message via 706, and transmitting the event to the management system via 708.

At 702, a command to test an entry point included in a service model associated with a computerized service is received from a management system. The management system (e.g., using a management server) can transmit the command to a monitoring mechanism of an agent device within a customer environment that includes the components associated with the service model. The monitoring mechanism can receive the command from the management system. The command received from the management system can include a test message. The test message may, for example, include a request to access a component associated with the entry point to be tested using a protocol associated with that entry point. Alternatively, the command can include information used to generate a test message. For example, the command received from the management system can include an indication of an entry point to be tested. In another example, the command may include an indication of a type of response to monitor, such as based on a request included in the test message.

The monitoring mechanism can receive, from the management system, the service model, a subset of the service model, a transformation of the service model, or information based on the service model to the monitoring mechanism. For example, the service model can be generated using a service model generator of the management system. After being generated, the service model generator or another component of the management system can store the service model within a database. Performing a test of one or more of the entry points included in the service model using the monitoring mechanism may thus include the monitoring mechanism receiving the service model or information thereof from the management system. For example, the monitoring mechanism can use the service model to identify a CI representing a component associated with an entry point to test. The CI can indicate a protocol to use to test the entry point.

At 704, a test message can be transmitted to the entry point to be tested using a protocol associated with that entry point. For example, the monitoring mechanism can use a test message received from the management system (such as where the command includes the test message) or generated based on information received from the management system. The test message can include a request to access a component associated with the entry point to test. The monitoring mechanism may use other information related to the service model to transmit the test message. For example, the monitoring mechanism can identify a port used by the component associated with the test message. The port can indicate the type of component (e.g., that the component is database software) and/or the protocol to use to transmit the test message.

At 706, an event can be generated based on a response to the test message. For example, the monitoring mechanism can receive a response to the test message, such as from the component associated with the entry point that was tested. The response can be used to determine a metric. For example, the metric can indicate that a connection to the component associated with the entry point is disrupted (e.g., which may be caused by a power, network, hardware, or like failure). In another example, the metric can indicate that the component associated with the entry point is demonstrating performance issues (e.g., where the response time for accessing the component is slow, such as compared to a threshold for measuring response times).

The event can be generated based on a metric. For example, the agent device (e.g., using the monitoring mechanism or another module) can process the metric to generate an event after determining that the metric breaches a threshold associated with the metric. There may be thresholds defined for one or more metrics, such as based on the types of those metrics. For example, metrics relating to the connection status of a component can be associated with a threshold specifying to generate an event where the metric has been repeatedly determined over a specified period of time. For example, the threshold may be breached where three responses to test messages over a period of two minutes indicate a disrupted connection to a component associated with a particular entry point. The event can include a notification, warning, log, or other indication of the metric. At 708, the event can be transmitted to the management system.

In some implementations, the technique 700 can include the agent device receiving the monitoring mechanism from the management system. For example, the monitoring mechanism can be a plugin that, when installed on the agent device, configures the agent device to process the command for testing the entry point included in the service model. The agent device can open a connection to the management system, such as to initiate communications between the agent device and the management system. The monitoring mechanism can then be transmitted from the management system to the agent device using the opened connection.

An implementation includes means for, using a discovery mechanism, performing a discovery process based on an initial entry point of a computerized service; means for generating a service model based on results of the discovery process, the service model including indications of a plurality of components of the computerized service and indications of a plurality of entry points including the initial entry point and at least one additional entry point used for communication between ones of the plurality of components; means for, using a monitoring mechanism, testing at least one entry point of the plurality of entry points using at least one protocol associated with the at least one entry point; and means for processing an event generated based on the test.

An implementation includes means for receiving, from a management system, a command to test an entry point included in a service model associated with a computerized service; means for transmitting a test message to the entry point using a protocol associated with the entry point; means for generating an event based on a response to the test message; and means for transmitting the event to the management system.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and RAM blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for monitoring a computerized service including a plurality of interconnected components within a computer network, the system comprising:
   an agent device within the computer network, the agent device comprising:
      a first memory; and
      a first processor, wherein the first memory includes first instructions executable by the first processor to:
         using a discovery mechanism, perform a discovery process based on an initial entry point of the computerized service; and
         using a monitoring mechanism, test an entry point of a plurality of entry points using at least one protocol associated with the entry point, wherein the plurality of entry points comprises the initial entry point and the plurality of entry points are respective attributes of the plurality of interconnected components that are indicative of respective communication connections to the plurality of interconnected components, wherein testing the entry point comprises transmitting a test message to the entry point using the at least one protocol and determining a metric based on a response to the test message, and wherein the metric indicates one or more of a disrupted connection to a first interconnected component of the plurality of interconnected components, a slow response time for accessing the first interconnected component, and a content mismatch between the first interconnected component and a second interconnected component of the plurality of interconnected components; and
   a management system external to the computer network, the management system comprising:
      a second memory; and
      a second processor, wherein the second memory includes second instructions executable by the second processor to:
         receive results of the discovery process from the agent device;
         generate a service model based on the results of the discovery process, the service model including indications of the plurality of the interconnected components and additional indications of the initial entry point and at least one additional entry point of the plurality of entry points used for communication between ones of the plurality of interconnected components;
         and
         process an event generated based on the metric in response to a determination that the metric breaches a threshold associated with the metric;
      wherein a firewall prevents the management system from accessing the plurality of interconnected components, and the agent device initiates a connection between the agent device and the management system to communicate data to the management system through the firewall.

2. The system of claim 1, wherein the first instructions to perform the discovery process based on the initial entry point of the computerized service include instructions to:
   transmit a discovery probe to an interconnected component of the plurality of interconnected components to determine one or more associated entry points of the entry point, wherein the interconnected component is referenced by the initial entry point.

3. The system of claim 1, wherein the second instructions to generate the service model based on the results of the discovery process include instructions to:
   associate ones of the plurality of entry points with the ones of the plurality of interconnected components.

4. The system of claim 1, wherein the first instructions to test the entry point of the plurality of entry points using the at least one protocol associated with the entry point include instructions to:
   select a subset of the plurality of entry points based on an entry point type or a configuration item type.

5. The system of claim 1, wherein the first instructions include instructions to:
   determine whether to test the entry point using the at least one protocol based on a status indication of the service model.

6. A method for monitoring a computerized service including a plurality of interconnected components within a computer network, the method comprising:
   performing, via a discovery mechanism of an agent device within the computer network, a discovery process based on an initial entry point of the computerized service;
   receiving, via a management system external to the computer network, results of the discovery mechanism from the agent device;
   generating, via the management system, a service model based on the results of the discovery process, the service model including indications of the plurality of the interconnected components and additional indications of the initial entry point and at least one additional entry point of a plurality of entry points used for communication between ones of the plurality of interconnected components;
   using a monitoring mechanism, testing, via the agent device, an entry point of the plurality of entry points using at least one protocol associated with the entry point, wherein the plurality of entry points comprises the initial entry point and the plurality of entry points are respective attributes of the plurality of interconnected components that are indicative of respective communication connections to the plurality of interconnected components, wherein testing the entry point comprises transmitting a test message to the entry point using the at least one protocol and determining a metric based on a response to the test message, and wherein the metric indicates one or more of a disrupted connection to a first interconnected component of the plurality of interconnected components, a slow response time for accessing the first interconnected component, and a content mismatch between the first interconnected component and a second interconnected component of the plurality of interconnected components; and processing, via the management system, an event generated based on the metric in response to a determination that the metric breaches a threshold associated with the metric;

wherein a firewall prevents the management system from accessing the plurality of interconnected components, and the agent device initiates a connection between the agent device and the management system to communicate data to the management system through the firewall.

7. The method of claim 6, wherein performing the discovery process based on the initial entry point of the computerized service comprises:

transmitting, via the agent device, a discovery probe to an interconnected component of the plurality of interconnected components to determine one or more associated entry points of the entry point, wherein the interconnected component is referenced by the initial entry point.

8. The method of claim 6, wherein generating the service model based on the results of the discovery process comprises:

associating, via the management system, ones of the plurality of entry points with the ones of the plurality of interconnected components.

9. The method of claim 6, wherein testing the entry point of the plurality of entry points using the at least one protocol associated with the entry point comprises:

selecting a subset of the plurality of entry points based on an entry point type or a configuration item type.

10. The method of claim 6, the method comprising:

determining, via the agent device, whether to test the entry point using the at least one protocol based on a status indication of the service model.

11. A non-transitory computer-readable storage medium comprising processor-executable routines that, when executed by a processor, facilitate a performance of operations to monitor a computerized service including a plurality of interconnected components within a computer network, the operations comprising:

initiating a connection through a firewall to a management system external to the computer network, wherein the firewall prevents the management system from accessing the plurality of interconnected components;

receiving, from the management system, a command to test an entry point included in a service model associated with the computerized service, wherein the entry point is an attribute of an interconnected component of the plurality of interconnected components that is indicative of a communication connection to the interconnected component, wherein the command to test the entry point comprises a command to transmit a test message to the entry point using at least one protocol associated with the entry point and determine a metric based on a response to the test message, and wherein the metric indicates one or more of a disrupted connection to a first interconnected component of the plurality of interconnected components, a slow response time for accessing the first interconnected component, and a content mismatch between the first interconnected component and a second interconnected component of the plurality of interconnected components;

transmitting the test message to the entry point using the at least one protocol associated with the entry point;

generating an event based on the metric in response to a determination that the metric breaches a threshold associated with the metric; and transmitting the event to the management system.

12. The non-transitory computer-readable storage medium of claim 11, the operations comprising:

receiving, from the management system, a monitoring mechanism configured to process the command by transmitting the test message and generating the event.

13. The system of claim 1, wherein the second instructions include instructions to perform an impact calculation operation against the service model based on the event to determine a change in status of one or more interconnected components of the plurality of interconnected components.

* * * * *